(12) United States Patent
Baba

(10) Patent No.: US 11,194,150 B2
(45) Date of Patent: Dec. 7, 2021

(54) OBJECTIVE LENS FOR AN ENDOSCOPE AND ENDOSCOPE

(71) Applicant: FUJIFILM Corporation, Tokyo (JP)

(72) Inventor: Tomoyuki Baba, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 43 days.

(21) Appl. No.: 16/801,111

(22) Filed: Feb. 25, 2020

(65) Prior Publication Data

US 2020/0271916 A1    Aug. 27, 2020

(30) Foreign Application Priority Data

Feb. 27, 2019   (JP) .............................. JP2019-034992

(51) Int. Cl.
```
G02B 23/24      (2006.01)
G02B 13/18      (2006.01)
G02B 9/60       (2006.01)
G02B 13/00      (2006.01)
G02B 27/00      (2006.01)
```
(52) U.S. Cl.
CPC ............. *G02B 23/243* (2013.01); *G02B 9/60* (2013.01); *G02B 13/0045* (2013.01); *G02B 13/18* (2013.01); *G02B 27/0025* (2013.01)

(58) Field of Classification Search
None
See application file for complete search history.

(56) References Cited

U.S. PATENT DOCUMENTS

| | | | |
|---|---|---|---|
| 4,976,522 A | 12/1990 | Igarashi | |
| 5,087,989 A | 2/1992 | Igarashi | |
| 9,176,306 B2 * | 11/2015 | Tsutsumi | ................. G02B 9/00 |
| 10,459,214 B2 * | 10/2019 | Inoue | ................... G02B 23/243 |
| 2012/0224268 A1 * | 9/2012 | Takato | ............... G02B 13/0045 |
| | | | 359/648 |
| 2014/0146404 A1 * | 5/2014 | Tsutsumi | ................. G02B 9/04 |
| | | | 359/740 |
| 2016/0238831 A1 * | 8/2016 | Baba | .................... G02B 23/243 |

FOREIGN PATENT DOCUMENTS

| | | |
|---|---|---|
| JP | H02277015 | 11/1990 |
| JP | H03145614 | 6/1991 |
| JP | 2804267 | 9/1998 |
| JP | 2009109576 | 5/2009 |

* cited by examiner

*Primary Examiner* — Mohammed Jebari
(74) *Attorney, Agent, or Firm* — JCIPRNET

(57) ABSTRACT

An objective lens for an endoscope consists of a negative front group, an aperture stop, and a positive rear group that are arranged in this order from an object side. The front group includes only a negative first lens as a lens. The rear group includes only four lenses that consist of a positive second lens, a positive third lens, a fourth lens, and a fifth lens arranged in this order from the object side, as lenses. The fourth lens and the fifth lens have refractive power having signs different from each other and are cemented to each other. Conditional expression determined in advance about the focal lengths of the second lens and the rear group is satisfied.

16 Claims, 9 Drawing Sheets

EXAMPLE 1

EXAMPLE 1

EXAMPLE 2

EXAMPLE 3

EXAMPLE 4

EXAMPLE 5

OBJECTIVE LENS FOR AN ENDOSCOPE AND ENDOSCOPE

CROSS-REFERENCE TO RELATED APPLICATIONS

The present application claims priority under 35 U.S.C. § 119 to Japanese Patent Application No. 2019-034992, filed on Feb. 27, 2019. The above application is hereby expressly incorporated by reference, in its entirety, into the present application.

BACKGROUND OF THE INVENTION

1. Field of the Invention

The present disclosure relates to an objective lens for an endoscope and an endoscope.

2. Description of the Related Art

In the related art, endoscopes have been used for the observation, treatment, and the like for the inside of a patient's body in a medical field. JP1991-0145614A (JP-H03-0145614A), JP1990-0277015A (JP-H03-0277015A), JP2804267B, and JP2009-109576A disclose lens systems that can be used as objective lenses for an endoscope. Each of the lens systems comprises a group having negative refractive power, a stop, and a group having positive refractive power arranged in this order from an object side toward an image side.

SUMMARY OF THE INVENTION

An objective lens for an endoscope which has a wide angle of view to allow a user to make an observation in a wide range and in which aberrations including a chromatic aberration are corrected well to allow a user to accurately specify a lesion portion is required. On the other hand, it is desired that the entire length and the outer diameter of a lens system are adapted to be small to reduce patient's burden.

However, a wide angle of view is not ensured up to a level having been required in recent years in the lens systems disclosed in JP1991-0145614A (JP-H03-0145614A), JP1990-0277015A (JP-H03-0277015A), and JP2804267B. It is desired that the lens system disclosed in JP2009-109576A has a wider angle of view.

The disclosure has been made in consideration of the above-mentioned circumstances, and an object of the disclosure is to provide an objective lens for an endoscope that has high optical performance since a wide angle of view is ensured and aberrations including a chromatic aberration are corrected well even while the entire length and the outer diameter of a lens system are reduced and an endoscope comprising the objective lens for an endoscope.

An objective lens for an endoscope according to an aspect of the disclosure consists of a front group having negative refractive power, an aperture stop, and a rear group having positive refractive power that are arranged in this order from an object side toward an image side. The front group comprises only a first lens having negative refractive power as a lens; the rear group comprises only four lenses that consist of a second lens having positive refractive power, a third lens having positive refractive power, a fourth lens, and a fifth lens arranged in this order from the object side toward the image side, as lenses; and the fourth lens and the fifth lens have refractive power having signs different from each other and are cemented to each other. In a case where a focal length of the second lens is denoted by f2, a focal length of the rear group is denoted by fb, a radius of curvature of a surface of the second lens close to the object side is denoted by R2f, and a radius of curvature of a surface of the second lens close to the image side is denoted by R2r, Conditional expressions (1) and (2) are satisfied.

$$1 < f2/fb < 1.8 \quad (1)$$

$$0 < (R2f+R2r)/(R2f-R2r) < 5 \quad (2)$$

It is preferable that the objective lens for an endoscope according to the aspect satisfies at least one of Conditional expression (1-1) or (2-1).

$$1.2 < f2/fb < 1.6 \quad (1-1)$$

$$0.5 < (R2f+R2r)/(R2f-R2r) < 1.5 \quad (2-1)$$

In a case where a focal length of the front group is denoted by fa, it is preferable that the objective lens for an endoscope according to the aspect satisfies Conditional expression (3) and it is more preferable that the objective lens for an endoscope according to the aspect satisfies Conditional expression (3-1).

$$-0.8 < fa/fb < -0.4 \quad (3)$$

$$-0.7 < fa/fb < -0.5 \quad (3-1)$$

In a case where a focal length of the third lens is denoted by f3, a radius of curvature of a surface of the third lens close to the object side is denoted by R3f, and a radius of curvature of a surface of the third lens close to the image side is denoted by R3r, it is preferable that the objective lens for an endoscope according to the aspect satisfies Conditional expressions (4) and (5). Further, it is more preferable that the objective lens for an endoscope according to the aspect of the disclosure satisfies at least one of Conditional expression (4-1) or (5-1) in a state where the objective lens for an endoscope according to the aspect of the disclosure satisfies Conditional expressions (4) and (5).

$$2 < f3/fb < 5 \quad (4)$$

$$0 < (R3f+R3r)/(R3f-R3r) < 5 \quad (5)$$

$$2.4 < f3/fb < 3.2 \quad (4-1)$$

$$0.5 < (R3f+R3r)/(R3f-R3r) < 1.5 \quad (5-1)$$

In a case where a radius of curvature of a surface of the first lens close to the object side is denoted by R1f and a radius of curvature of a surface of the first lens close to the image side is denoted by R1r, it is preferable that the objective lens for an endoscope according to the aspect satisfies Conditional expression (6) and it is more preferable that the objective lens for an endoscope according to the aspect satisfies Conditional expression (6-1).

$$0.95 < (R1f+R1r)/(R1f-R1r) < 1.2 \quad (6)$$

$$1 \leq (R1f+R1r)/(R1f-R1r) < 1.05 \quad (6-1)$$

It is preferable that a surface of the first lens close to the object side is a flat surface in the objective lens for an endoscope according to the aspect.

In a case where an Abbe's number of the fourth lens with respect to a d line is denoted by vd4 and an Abbe's number of the fifth lens with respect to the d line is denoted by vd5, it is preferable that the objective lens for an endoscope according to the aspect satisfies Conditional expression (7)

and it is more preferable that the objective lens for an endoscope according to the aspect satisfies Conditional expression (7-1).

$$45<|vd4-vd5|<90 \tag{7}$$

$$55<|vd4-vd5|<80 \tag{7-1}$$

It is preferable that the fourth lens has positive refractive power and the fifth lens has negative refractive power in the objective lens for an endoscope according to the aspect.

An endoscope according to another aspect of the disclosure comprises the objective lens for an endoscope according to the aspect of the disclosure.

"Consisting of" and "consist of" in this specification may intend to include a lens substantially not having refractive power; optical elements other than a lens, such as a stop, a filter, and a cover glass; a lens flange; a lens barrel; an image pickup element; and the like other than described components.

"~ group having positive refractive power" in this specification means that a group has positive refractive power as a whole. Likewise, "~ group having negative refractive power" means that a group has negative refractive power as a whole. "Lens having positive refractive power" and "positive lens" are synonymous with each other. "Lens having negative refractive power" and "negative lens" are synonymous with each other.

"Single lens" means one lens that is not cemented. A compound aspherical lens (a lens of which a spherical lens and an aspherical film formed on the spherical lens are integrated and which functions as one aspherical lens as a whole) is treated as one lens without being regarded as a cemented lens. The sign of refractive power, the radius of curvature of the surface, and the shape of the surface of a lens including an aspheric surface are considered in a paraxial region unless otherwise specified. With regard to the sign of a radius of curvature, the sign of the radius of curvature of a surface having a convex shape toward an object side is positive and the sign of the radius of curvature of a surface having a convex shape toward an image side is negative.

In this specification, a "focal length" used in Conditional expressions is a paraxial focal length. Values in Conditional expressions are values that are obtained in a case where the d line is used as a reference. "d line", "C line", "F line", and "h line" described in this specification are emission lines, and the wavelength of the d line is 587.56 nm (nanometer), the wavelength of the C line is 656.27 nm (nanometer), the wavelength of the F line is 486.13 nm (nanometer), and the wavelength of the h line is 404.66 nm (nanometer).

according to the disclosure, it is possible to provide an objective lens for an endoscope that has high optical performance since a wide angle of view is ensured and aberrations including a chromatic aberration are corrected well even while the entire length and the outer diameter of a lens system are reduced and an endoscope comprising the objective lens for an endoscope.

DESCRIPTION OF THE PREFERRED EMBODIMENTS

Figure 1:
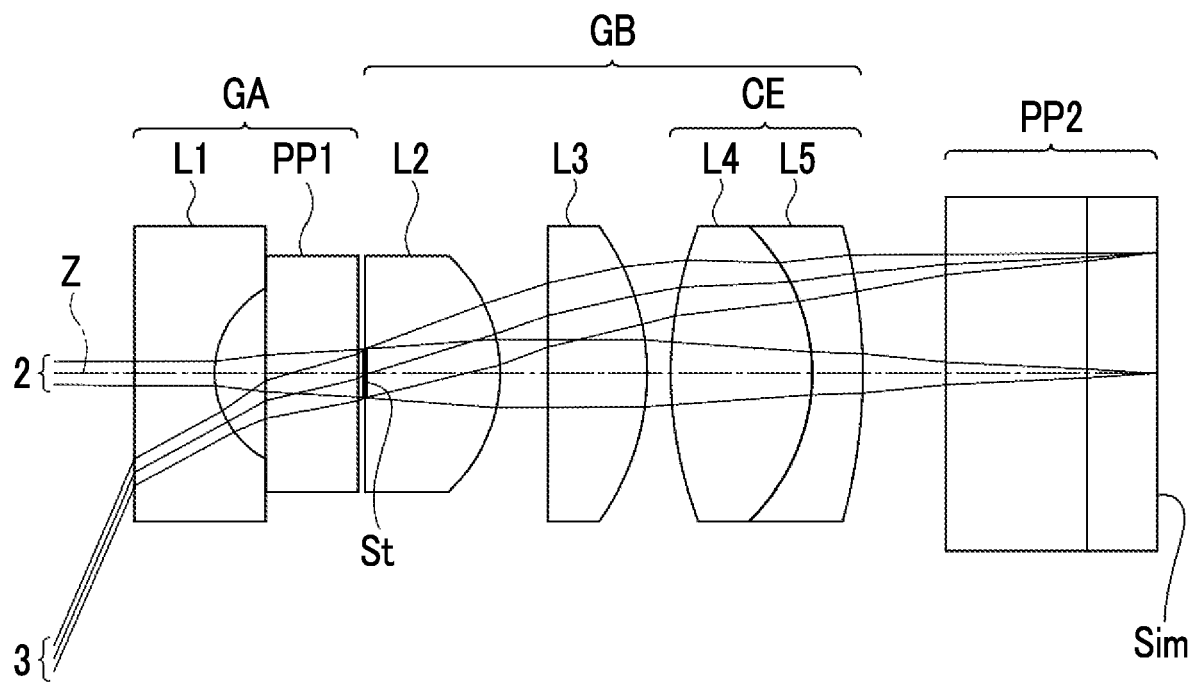
FIG. 1 is a cross-sectional view showing the configuration of an objective lens for an endoscope according to an embodiment of the disclosure corresponding to an objective lens for an endoscope of Example 1 of the disclosure and luminous flux.

Embodiments of the disclosure will be described in detail below with reference to the drawings. FIG. 1 is a diagram showing the configuration of an objective lens for an endoscope according to an embodiment of the disclosure on a cross section including an optical axis Z. An example shown in FIG. 1 corresponds to Example 1 to be described later. In FIG. 1, a left side is an object side and a right side is an image side and on-axis luminous flux 2 and luminous flux 3 corresponding to the maximum angle of view are also shown.

The objective lens for an endoscope according to the embodiment of the disclosure consists of a front group GA having negative refractive power, an aperture stop St, and a rear group GB having positive refractive power that are arranged along the optical axis Z in this order from the object side toward the image side. Since the negative lens group and the positive lens group are arranged in this order from the object side toward the image side, a retrofocus type lens system is formed. Accordingly, it is possible to ensure a back focus and it is advantageous in obtaining a wide angle of view without increasing the outer diameter of the lens. The aperture stop St shown in FIG. 1 does not represent a shape and represents the position thereof on the optical axis Z.

The front group GA comprises only a first lens L1 having negative refractive power as a lens. Distortion and field curvature can be suppressed by the first lens L1 and it is advantageous in reducing the outer diameter of the lens.

It is preferable that the surface of the first lens L1 close to the object side is a flat surface. In this case, the manufacturability of the first lens L1 can be improved and the adhesion of dust, liquid, and/or the like to the surface of the first lens L1 close to the object side can be suppressed.

In the front group GA of the example shown in FIG. 1, an optical member PP1 is disposed on the image side of the first lens L1. The optical member PP1 is a member of which an incident surface and an emitting surface are parallel to each other and which does not have refractive power, and is not a lens. The optical member PP1 may also be omitted in the disclosure. The optical member PP1 may also be made to have a filter function as necessary.

The rear group GB comprises only four lenses that consist of a second lens L2 having positive refractive power, a third lens L3 having positive refractive power, a fourth lens L4, and a fifth lens L5 arranged in this order from the object side toward the image side, as lenses. A spherical aberration can be suppressed by the second lens L2. A spherical aberration and field curvature can be suppressed by the third lens L3.

The fourth lens L4 and the fifth lens L5 are adapted to have refractive power having signs different from each other. Further, the fourth lens L4 and the fifth lens L5 are cemented to each other to form a cemented lens CE. Since an axial chromatic aberration and a lateral chromatic aberration can be suppressed by the cemented lens CE, it is advantageous in suppressing an axial chromatic aberration and a lateral chromatic aberration over the entire range to a visible range from a short wavelength range near a wavelength of 400 nm (nanometer).

Further, the cemented lens CE may be adapted so that the fourth lens L4 has positive refractive power and the fifth lens L5 has negative refractive power, or may be adapted so that the fourth lens L4 has negative refractive power and the fifth lens L5 has positive refractive power. In a case where the cemented lens CE is adapted so that the fourth lens L4 has positive refractive power and the fifth lens L5 has negative refractive power as in the example shown in FIG. 1, it is easier to correct distortion and field curvature well than that in a case where the fourth lens L4 has negative refractive power and the fifth lens L5 has positive refractive power.

As in the example shown in FIG. 1, an optical member PP2 is disposed between the fifth lens L5 and an image plane Sim. The optical member PP2 is a member of which an incident surface and an emitting surface are parallel to each other and which does not have refractive power, and is not a lens. The optical member PP2 is a member assumed as a filter, a cover glass, and/or the like. The optical member PP2 may also be omitted in the disclosure.

In a case where the focal length of the second lens L2 is denoted by f2 and the focal length of the rear group GB is denoted by fb, the objective lens for an endoscope according to the embodiment of the disclosure satisfies Conditional expression (1). Since f2/fb is made to be larger than the lower limit of Conditional expression (1), it is easy to correct a spherical aberration well. Since f2/fb is made to be smaller than the upper limit of Conditional expression (1), it is easy to suppress an increase in the entire length and the outer diameter of the lens system. Generally, as the angle of view is increased, the outer diameter of the lens is increased. However, since f2/fb is made to be smaller than the upper limit of Conditional expression (1), it is advantageous in ensuring a wide angle of view while reducing the outer diameter of the lens. Better characteristics can be obtained in a case where the objective lens for an endoscope according to the embodiment of the disclosure is adapted to satisfy Conditional expression (1-1).

$$1 < f2/fb < 1.8 \tag{1}$$

$$1.2 < f2/fb < 1.6 \tag{1-1}$$

Further, in a case where the radius of curvature of the surface of the second lens L2 close to the object side is denoted by R2f and the radius of curvature of the surface of the second lens L2 close to the image side is denoted by R2r, the objective lens for an endoscope according to the embodiment of the disclosure satisfies Conditional expression (2). Since the objective lens for an endoscope according to the embodiment of the disclosure satisfies Conditional expression (2), it is easy to correct a spherical aberration well. Furthermore, better characteristics can be obtained in a case where the objective lens for an endoscope according to the embodiment of the disclosure is adapted to satisfy Conditional expression (2-1).

$$0 < (R2f+R2r)/(R2f-R2r) < 5 \tag{2}$$

$$0.5 < (R2f+R2r)/(R2f-R2r) < 1.5 \tag{2-1}$$

Moreover, in a case where the focal length of the front group GA is denoted by fa and the focal length of the rear group GB is denoted by fb, it is preferable that the objective lens for an endoscope according to the embodiment of the disclosure satisfies Conditional expression (3). In a case where fa/fb is made to be larger than the lower limit of Conditional expression (3), it is advantageous in increasing the angle of view. In a case where fa/fb is made to be smaller than the upper limit of Conditional expression (3), it is advantageous in reducing the outer diameter of the lens. In addition, better characteristics can be obtained in a case where the objective lens for an endoscope according to the embodiment of the disclosure is adapted to satisfy Conditional expression (3-1).

$$-0.8 < fa/fb < -0.4 \tag{3}$$

$$-0.7 < fa/fb < -0.5 \tag{3-1}$$

Further, in a case where the focal length of the third lens L3 is denoted by f3 and the focal length of the rear group GB is denoted by fb, it is preferable that the objective lens for an endoscope according to the embodiment of the disclosure satisfies Conditional expression (4). In a case where f3/fb is made to be larger than the lower limit of the Conditional expression (4), it is easy to correct a spherical aberration and field curvature well. In a case where f3/fb is made to be smaller than the upper limit of the Conditional expression (4), it is easy to suppress an increase in the entire length and the outer diameter of the lens system. Furthermore, better characteristics can be obtained in a case where the objective lens for an endoscope according to the embodiment of the disclosure is adapted to satisfy Conditional expression (4-1).

$$2 < f3/fb < 5 \tag{4}$$

$$2.4 < f3/fb < 3.2 \tag{4-1}$$

In a case where the radius of curvature of the surface of the third lens L3 close to the object side is denoted by R3f and the radius of curvature of the surface of the third lens L3 close to the image side is denoted by R3r, it is preferable that the objective lens for an endoscope according to the embodiment of the disclosure satisfies Conditional expression (5). In a case where the objective lens for an endoscope according to the embodiment of the disclosure satisfies Conditional expression (5), it is easy to correct a spherical aberration and field curvature well. Moreover, better characteristics can be obtained in a case where the objective lens for an endoscope according to the embodiment of the disclosure is adapted to satisfy Conditional expression (5-1).

$$0 < (R3f+R3r)/(R3f-R3r) < 5 \tag{5}$$

$$0.5 < (R3f+R3r)/(R3f-R3r) < 1.5 \tag{5-1}$$

It is more preferable that the objective lens for an endoscope according to the embodiment of the disclosure satisfies Conditional expression (4) and Conditional expression (5) at the same time. It is still more preferable that the objective lens for an endoscope according to the embodiment of the disclosure satisfies at least one of Conditional expression (4-1) or Conditional expression (5-1) in a state where Conditional expression (4) and Conditional expression (5) are satisfied at the same time.

Further, in a case where the radius of curvature of the surface of the first lens L1 close to the object side is denoted by R1f and the radius of curvature of the surface of the first lens L1 close to the image side is denoted by R1r with regard to the first lens L1, it is preferable that the objective lens for an endoscope according to the embodiment of the disclosure satisfies Conditional expression (6). In a case where (R1f+R1r)/(R1f−R1r) is made to be larger than the lower limit of the Conditional expression (6), it is easy to correct distortion and field curvature well. In a case where (R1f+R1r)/(R1f−R1r) is made to be smaller than the upper limit of the Conditional expression (6), it is advantageous in reducing the outer diameter of the lens. Furthermore, better characteristics can be obtained in a case where the objective lens for an endoscope according to the embodiment of the disclosure is adapted to satisfy Conditional expression (6-1).

$$0.95 < (R1f+R1r)/(R1f-R1r) < 1.2 \quad (6)$$

$$1 \leq (R1f+R1r)/(R1f-R1r) < 1.05 \quad (6-1)$$

Further, in a case where the Abbe's number of the fourth lens L4 with respect to the d line is denoted by vd4 and the Abbe's number of the fifth lens L5 with respect to the d line is denoted by vd5 with regard to the cemented lens CE, it is preferable that the objective lens for an endoscope according to the embodiment of the disclosure satisfies Conditional expression (7). In a case where |vd4−vd5| is made to be larger than the lower limit of the Conditional expression (7), it is easy to suppress an axial chromatic aberration and a lateral chromatic aberration over the entire range to a visible range from a short wavelength range near a wavelength of 400 nm (nanometer). In a case where vd4−vd5 is made to be smaller than the upper limit of the Conditional expression (7), it is easy to optimally suppress an axial chromatic aberration and a lateral chromatic aberration by suppressing an excessive increase in the amount of correction of an axial chromatic aberration and a lateral chromatic aberration. Furthermore, better characteristics can be obtained in a case where the objective lens for an endoscope according to the embodiment of the disclosure is adapted to satisfy Conditional expression (7-1).

$$45 < |vd4-vd5| < 90 \quad (7)$$

$$55 < |vd4-vd5| < 80 \quad (7-1)$$

Since the above-mentioned preferable configuration and possible configuration can be randomly combined, it is preferable that the above-mentioned preferable configuration and possible configuration are appropriately selectively employed according to specifications to be required. According to the embodiment of the disclosure, it is possible to realize the objective lens for an endoscope that has high optical performance since a wide angle of view is ensured and aberrations including a chromatic aberration are corrected well even while the entire length and the outer diameter of a lens system are reduced. "A wide angle of view" mentioned here means that the maximum total angle of view is 130° or more.

Next, numerical examples of the objective lens for an endoscope according to the embodiment of the disclosure will be described. In consideration of situations where an endoscope is used, basic lens data and diagrams showing aberrations obtained in a case where an object of which a distance to the surface of the lens closest to the object side is 8 mm (millimeter) is observed are provided as the basic lens data and diagrams showing aberrations about all examples to be described below.

Example 1

Since a cross-sectional view showing the configuration of an objective lens for an endoscope of Example 1 and luminous flux is shown in FIG. 1 and an illustrating method therefor is as described above, the repeated description thereof will be partially omitted here. The objective lens for an endoscope of Example 1 consists of a front group GA having negative refractive power, an aperture stop St, and a rear group GB having positive refractive power that are arranged in this order from the object side toward the image side. The front group GA consists of a first lens L1 and an optical member PP1 that are arranged in this order from the object side toward the image side. The rear group GB consists of a second lens L2, a third lens L3, a fourth lens L4, and a fifth lens L5 that are arranged in this order from the object side toward the image side. Each of the first lens L1 and the fifth lens L5 is a negative lens. Each of the second lens L2, the third lens L3, and the fourth lens L4 is a positive lens. Each of the first lens L1, the second lens L2, and the third lens L3 is a single lens. The fourth lens L4 and the fifth lens L5 are cemented to each other to form a cemented lens CE. The overview of the objective lens for an endoscope of Example 1 has been described above.

The basic lens data of the objective lens for an endoscope of Example 1 are shown in Table 1, and the specifications thereof are shown in Table 2. In Table 1, surface numbers, which are obtained in a case where the surface closest to the object side is set as a first surface and the surface number is increased toward the image side one by one, are written in the column of Sn, the radii of curvature of the respective surfaces are written in the column of R, and a surface interval on an optical axis between each surface and a surface, which is positioned on the image side of each surface so as to be adjacent to each surface, is written in the column of D. Further, the refractive indexes of the respective components with respect to the d line are written in the column of Nd, and the Abbe's numbers of the respective components with respect to the d line are written in the column of vd.

In Table 1, the sign of the radius of curvature of a surface having a convex shape toward the object side is positive and the sign of the radius of curvature of a surface having a convex shape toward the image side is negative. In Table 1, the aperture stop St, the optical member PP1, and the optical member PP2 are also shown together. In Table 1, a surface number and the expression of (St) are written in the column of the surface number of a surface corresponding to the aperture stop St. A value of the lowest cell of the column of D in Table 1 is an interval between a surface closest to the image side and the image plane Sim in Table 1.

The value of the focal length f of the objective lens for an endoscope and the values of the back focus Bf, the F Number FNo, and the maximum total angle 2ω of view of the objective lens for an endoscope at an air conversion distance are shown in Table 2 with respect to the d line. (°) in the column of 2ω means that a unit is a degree. Numerical values, which are rounded off to a predetermined place, are written in Table 1 and Table 2.

TABLE 1

Example 1

| Sn | R | D | Nd | vd |
|---|---|---|---|---|
| 1 | ∞ | 0.3961 | 1.88299 | 40.78 |
| 2 | 0.5000 | 0.2539 | | |
| 3 | ∞ | 0.4516 | 2.00100 | 29.13 |
| 4 | ∞ | 0.0350 | | |
| 5(St) | ∞ | 0.0000 | | |
| 6 | ∞ | 0.6693 | 1.60342 | 38.03 |
| 7 | −0.8320 | 0.2358 | | |
| 8 | ∞ | 0.4931 | 1.49700 | 81.54 |
| 9 | −1.3040 | 0.1175 | | |
| 10 | 2.1280 | 0.7007 | 1.53775 | 74.70 |
| 11 | −1.0550 | 0.2500 | 1.95906 | 17.47 |
| 12 | −2.8600 | 0.4057 | | |
| 13 | ∞ | 0.7000 | 2.00100 | 29.13 |
| 14 | ∞ | 0.3500 | 1.51633 | 64.06 |
| 15 | ∞ | 0.0000 | | |

TABLE 2

Example 1

| f | 0.629 |
|---|---|
| Bf | 0.939 |
| FNo. | 4.85 |
| 2ω(°) | 134.4 |

Figure 6:
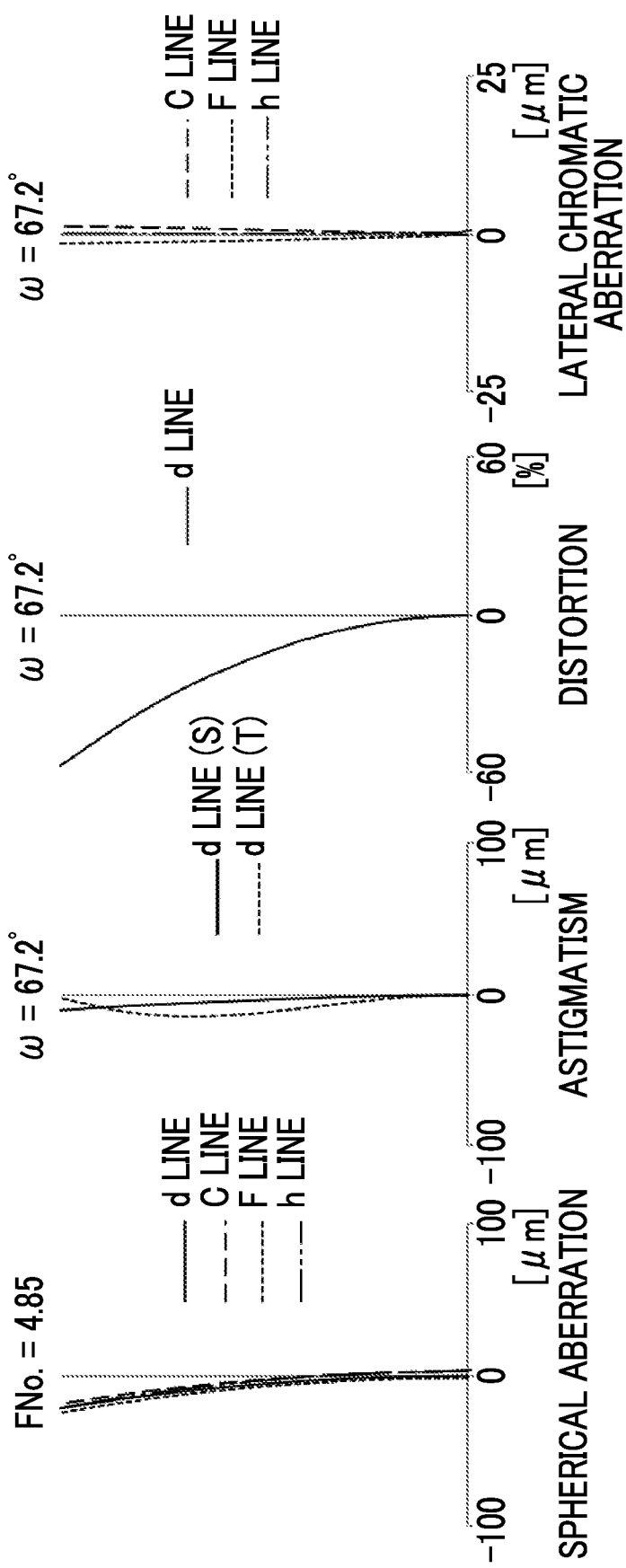
FIG. 6 is a diagram showing the respective aberrations of the objective lens for an endoscope of Example 1 of the disclosure.

A diagram showing the respective aberrations of the objective lens for an endoscope of Example 1 is shown in FIG. 6. A diagram showing a spherical aberration, a diagram showing astigmatism, a diagram showing distortion, and a diagram showing a lateral chromatic aberration are shown in FIG. 6 in this order from the left. In the diagram showing the spherical aberration, aberrations with respect to the d line, the C line, the F line, and the h line are shown by a solid line, a long-dashed line, a short-dashed line, and a two-dot chain line, respectively. In the diagram showing the astigmatism, an aberration with respect to the d line in a sagittal direction is shown by a solid line and an aberration with respect to a d line in a tangential direction is shown by a short-dashed line. In the diagram showing the distortion, an aberration with respect to the d line is shown by a solid line. In the diagram showing the lateral chromatic aberration, aberrations with respect to the C line, the F line, and the h line are shown by a long-dashed line, a short-dashed line, and a two-dot chain line, respectively. FNo. in the diagram showing the spherical aberration means an F number, and ω in the diagrams showing the other aberrations means the half angle of view.

Since the symbols, meanings, writing methods, and illustrating methods for data about Example 1 are the same as those of other examples to be described below unless otherwise specified, the repeated description thereof will be omitted below.

Example 2

Figure 2:
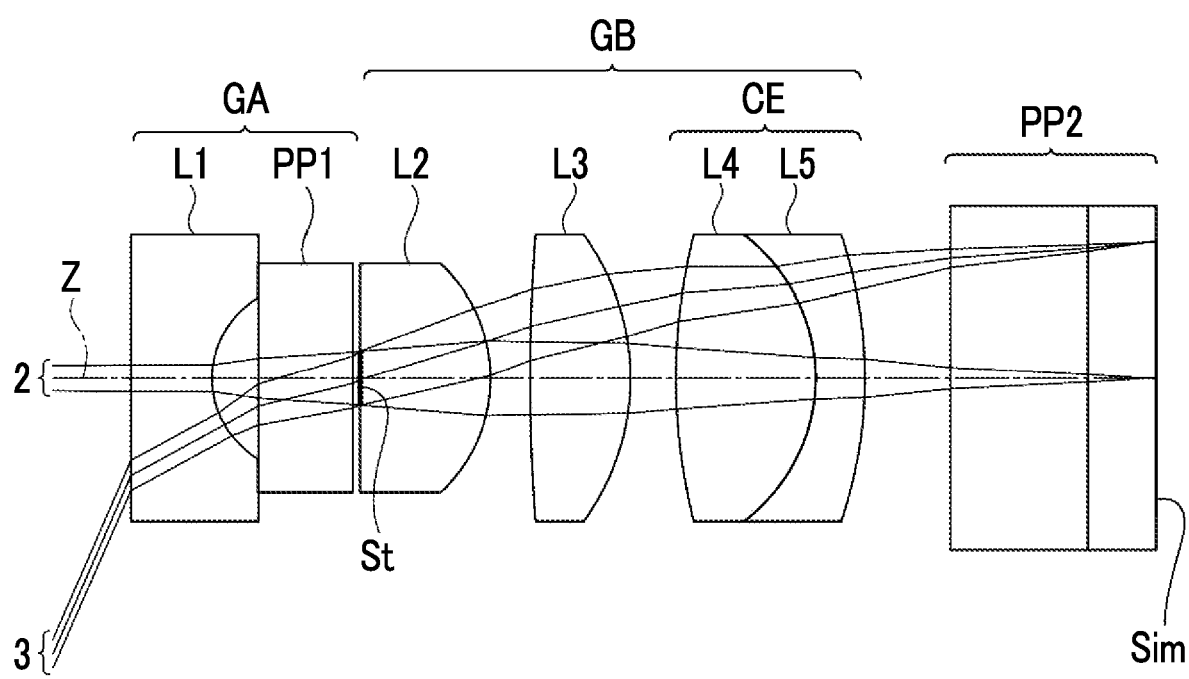
FIG. 2 is a cross-sectional view showing the configuration of an objective lens for an endoscope of Example 2 of the disclosure and luminous flux.
Figure 7:
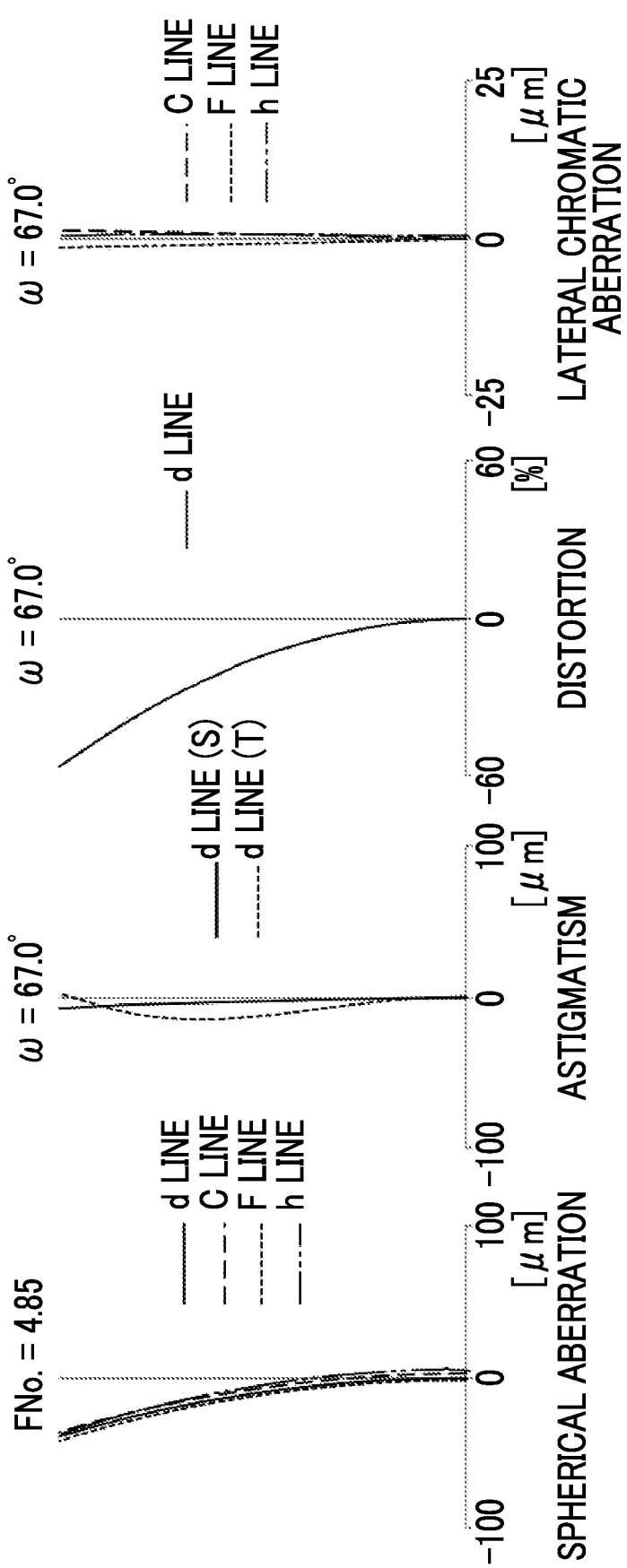
FIG. 7 is a diagram showing the respective aberrations of the objective lens for an endoscope of Example 2 of the disclosure.

A cross-sectional view showing the configuration of an objective lens for an endoscope of Example 2 and luminous flux is shown in FIG. 2. The objective lens for an endoscope of Example 2 has the same configuration as the overview of the objective lens for an endoscope of Example 1. The basic lens data of the objective lens for an endoscope of Example 2 are shown in Table 3, the specifications thereof are shown in Table 4, and a diagram showing the respective aberrations thereof is shown in FIG. 7.

TABLE 3

Example 2

| Sn | R | D | Nd | vd |
|---|---|---|---|---|
| 1 | ∞ | 0.4124 | 1.88299 | 40.78 |
| 2 | 0.5000 | 0.2376 | | |
| 3 | ∞ | 0.4769 | 2.00100 | 29.13 |
| 4 | ∞ | 0.0350 | | |
| 5(St) | ∞ | 0.0000 | | |
| 6 | ∞ | 0.6670 | 1.63930 | 44.87 |
| 7 | −0.8320 | 0.2015 | | |
| 8 | 10.2160 | 0.5143 | 1.43875 | 94.66 |
| 9 | −1.3040 | 0.2313 | | |
| 10 | 3.1250 | 0.7137 | 1.49700 | 81.54 |
| 11 | −0.9530 | 0.2500 | 1.92286 | 18.90 |
| 12 | −2.3820 | 0.4326 | | |
| 13 | ∞ | 0.7000 | 2.00100 | 29.13 |
| 14 | ∞ | 0.3500 | 1.51633 | 64.06 |
| 15 | ∞ | 0.0000 | | |

TABLE 4

Example 2

| f | 0.717 |
|---|---|
| Bf | 0.952 |
| FNo. | 4.85 |
| 2ω(°) | 134.0 |

Example 3

Figure 3:
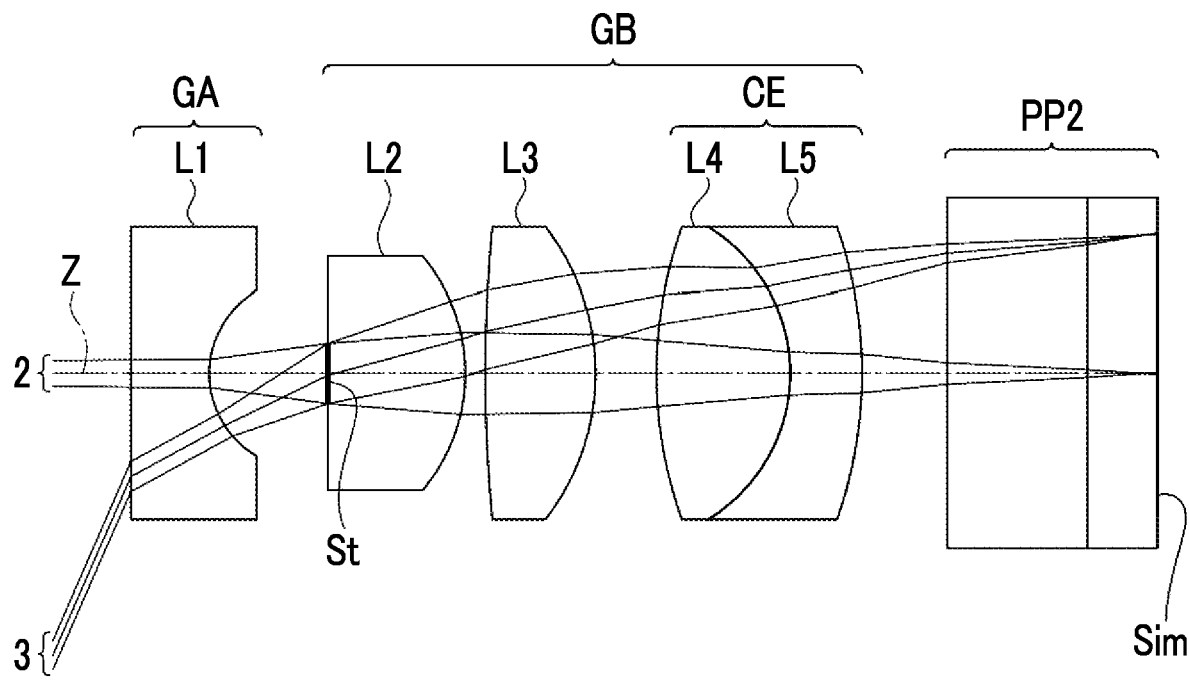
FIG. 3 is a cross-sectional view showing the configuration of an objective lens for an endoscope of Example 3 of the disclosure and luminous flux.
Figure 8:
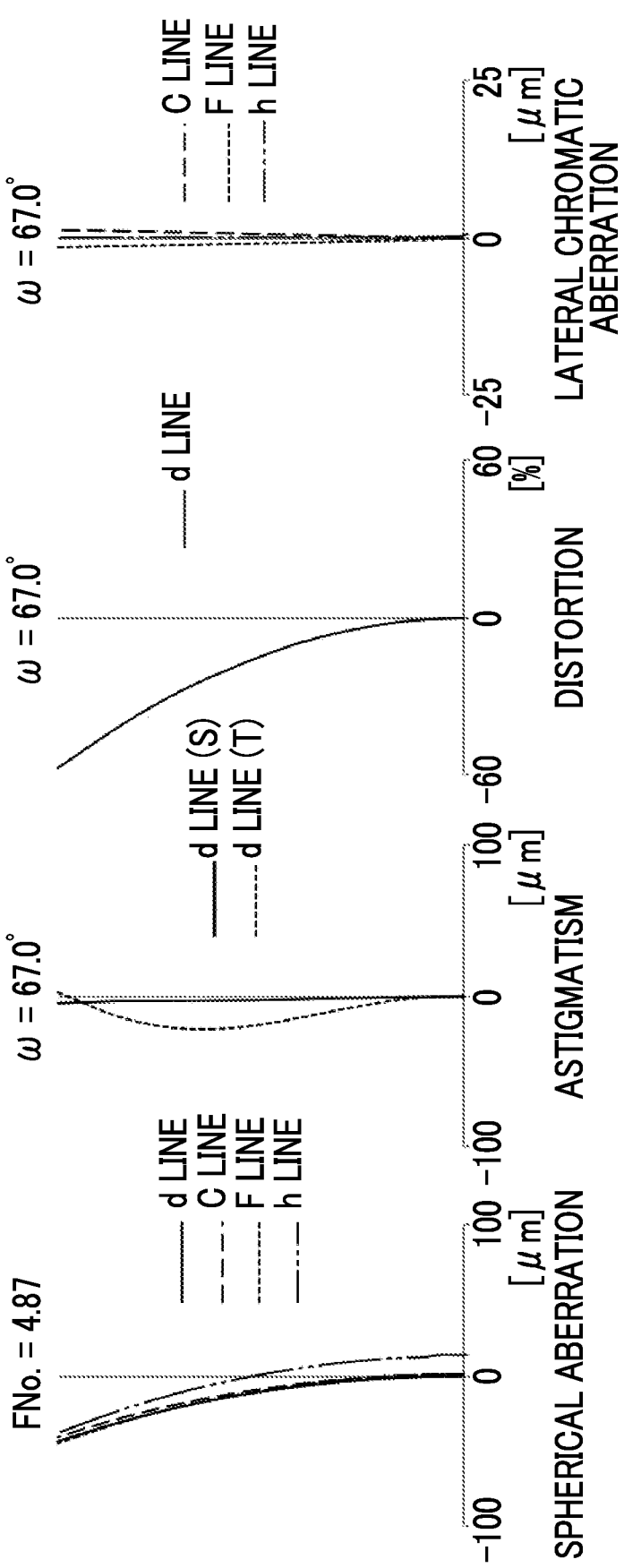
FIG. 8 is a diagram showing the respective aberrations of the objective lens for an endoscope of Example 3 of the disclosure.

A cross-sectional view showing the configuration of an objective lens for an endoscope of Example 3 and luminous flux is shown in FIG. 3. The objective lens for an endoscope of Example 3 has the same configuration as the overview of the objective lens for an endoscope of Example 1 except that a front group GA consists of only a first lens L1. The basic lens data of the objective lens for an endoscope of Example 3 are shown in Table 5, the specifications thereof are shown in Table 6, and a diagram showing the respective aberrations thereof is shown in FIG. 8.

TABLE 5

Example 3

| Sn | R | D | Nd | vd |
|---|---|---|---|---|
| 1 | ∞ | 0.3922 | 1.88299 | 40.78 |
| 2 | 0.5000 | 0.5928 | | |
| 3(St) | ∞ | 0.0000 | | |
| 4 | ∞ | 0.6866 | 1.67003 | 47.23 |
| 5 | −0.9530 | 0.1000 | | |
| 6 | 7.8360 | 0.5511 | 1.43875 | 94.66 |
| 7 | −1.2500 | 0.3015 | | |
| 8 | 2.2770 | 0.6690 | 1.43875 | 94.66 |
| 9 | −0.8920 | 0.3581 | 1.95906 | 17.47 |
| 10 | −2.3170 | 0.4268 | | |
| 11 | ∞ | 0.7000 | 2.00100 | 29.13 |
| 12 | ∞ | 0.3500 | 1.51633 | 64.06 |
| 13 | ∞ | 0.0000 | | |

TABLE 6

Example 3

| f | 0.724 |
|---|---|
| Bf | 0.945 |
| FNo. | 4.87 |
| 2ω(°) | 134.0 |

Example 4

Figure 4:
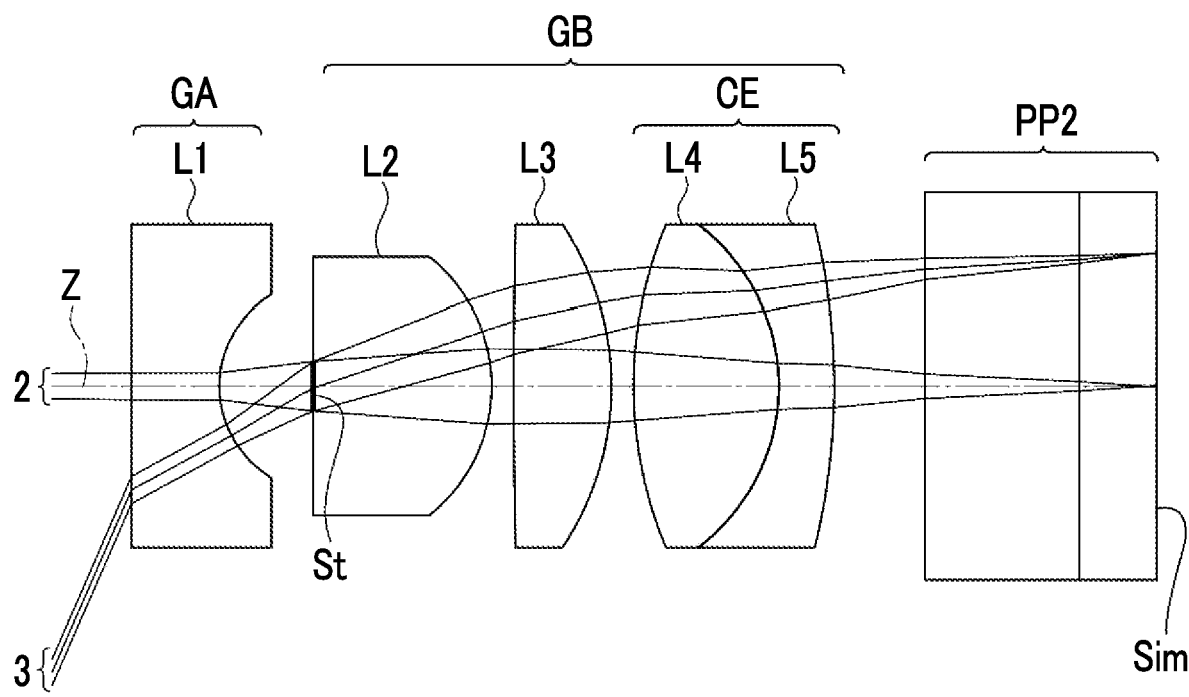
FIG. 4 is a cross-sectional view showing the configuration of an objective lens for an endoscope of Example 4 of the disclosure and luminous flux.
Figure 9:
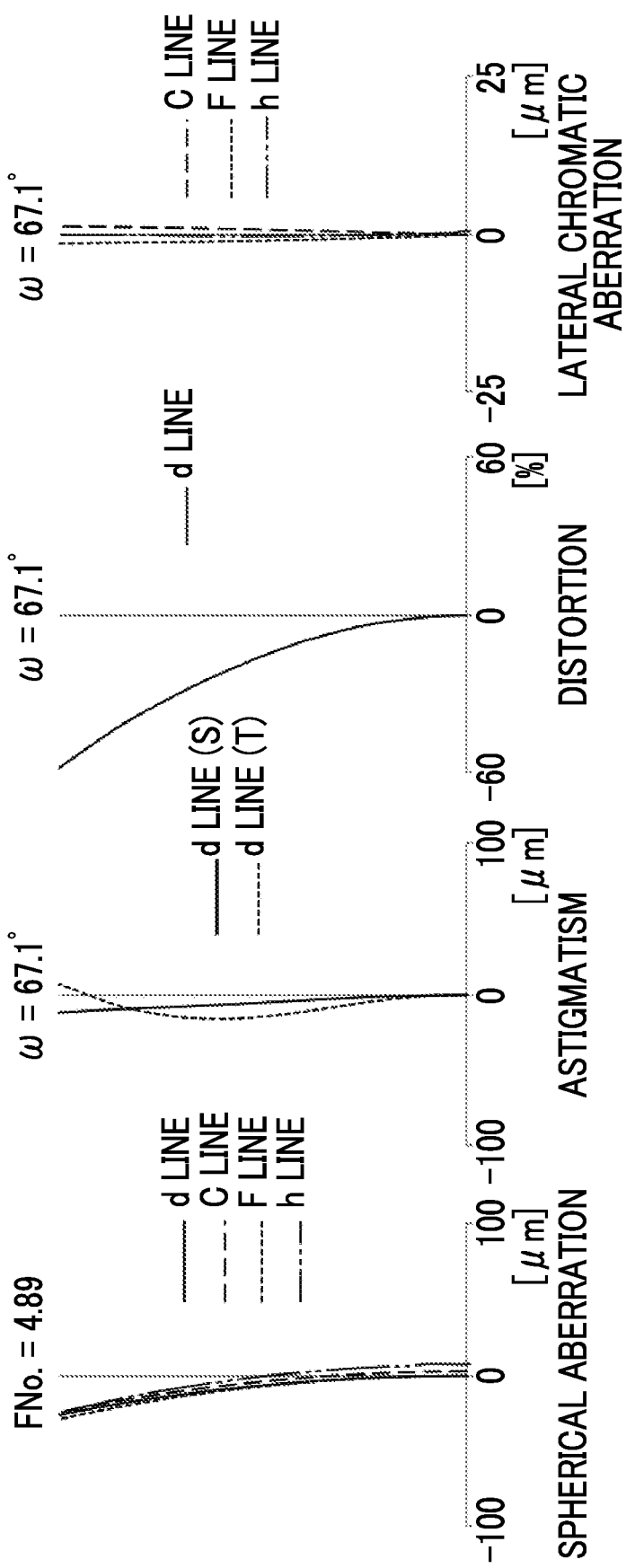
FIG. 9 is a diagram showing the respective aberrations of the objective lens for an endoscope of Example 4 of the disclosure.

A cross-sectional view showing the configuration of an objective lens for an endoscope of Example 4 and luminous flux is shown in FIG. 4. The objective lens for an endoscope of Example 4 has the same configuration as the overview of the objective lens for an endoscope of Example 1 except that a front group GA consists of only a first lens L1. The basic lens data of the objective lens for an endoscope of Example 4 are shown in Table 7, the specifications thereof are shown in Table 8, and a diagram showing the respective aberrations thereof is shown in FIG. 9.

TABLE 7

Example 4

| Sn | R | D | Nd | νd |
|---|---|---|---|---|
| 1 | ∞ | 0.3961 | 1.88299 | 40.78 |
| 2 | 0.5000 | 0.4226 | | |
| 3(St) | ∞ | 0.0000 | | |
| 4 | ∞ | 0.8068 | 1.59551 | 39.24 |
| 5 | −0.7780 | 0.1000 | | |
| 6 | 35.2160 | 0.4413 | 1.49700 | 81.54 |
| 7 | −1.3820 | 0.1000 | | |
| 8 | 1.9950 | 0.6581 | 1.53775 | 74.70 |
| 9 | −0.9530 | 0.2500 | 1.95906 | 17.47 |
| 10 | −3.2350 | 0.4046 | | |
| 11 | ∞ | 0.7000 | 2.00100 | 29.13 |
| 12 | ∞ | 0.3500 | 1.51633 | 64.06 |
| 13 | ∞ | 0.0000 | | |

TABLE 8

Example 4

| | |
|---|---|
| f | 0.637 |
| Bf | 0.937 |
| FNo. | 4.89 |
| 2ω(°) | 134.2 |

Example 5

Figure 5:
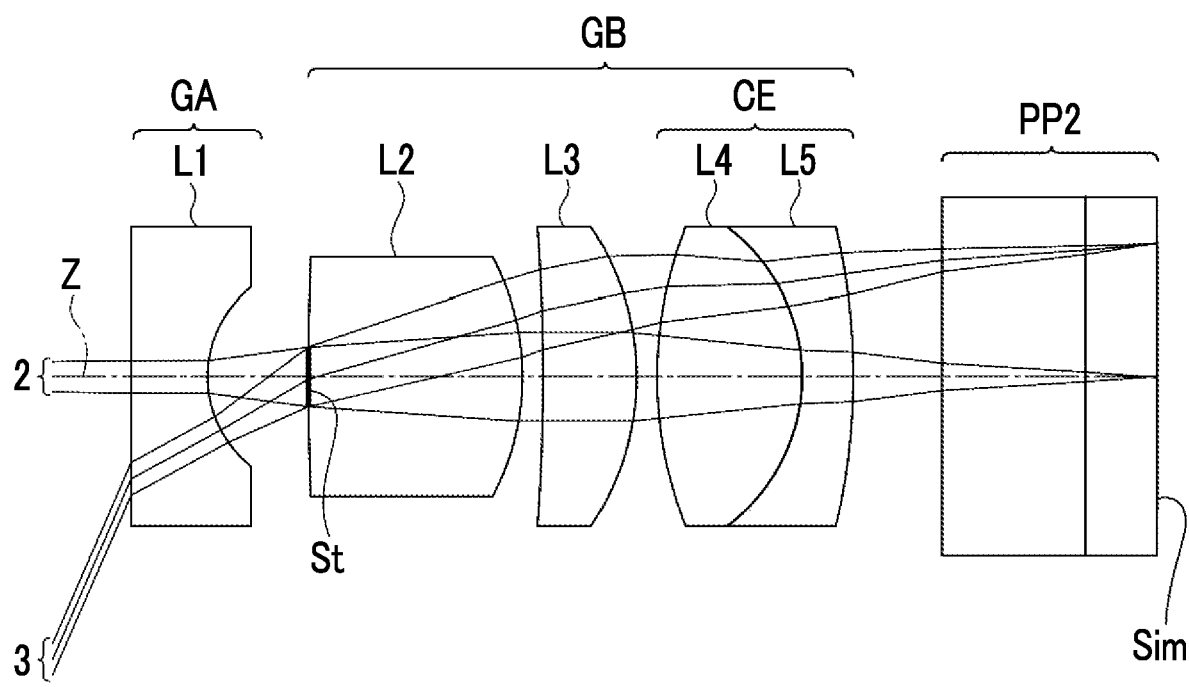
FIG. 5 is a cross-sectional view showing the configuration of an objective lens for an endoscope of Example 5 of the disclosure and luminous flux.
Figure 10:
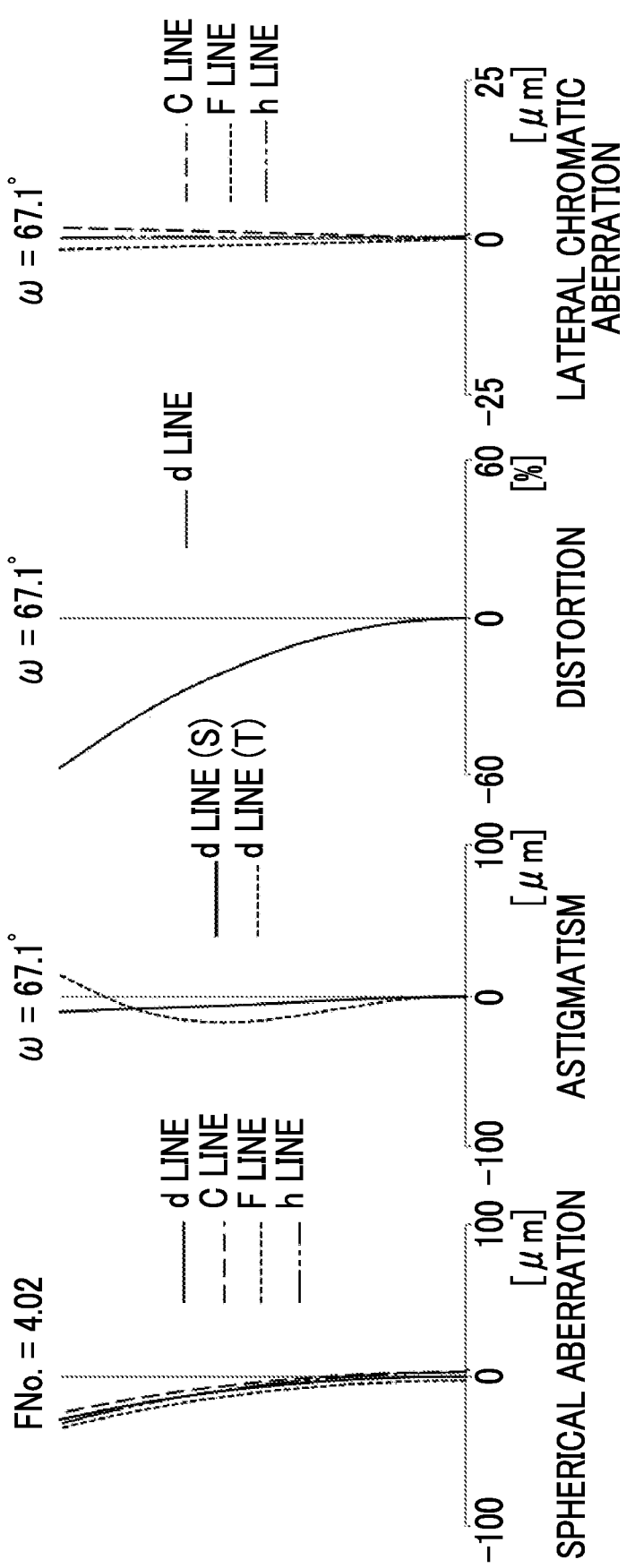
FIG. 10 is a diagram showing the respective aberrations of the objective lens for an endoscope of Example 5 of the disclosure.

A cross-sectional view showing the configuration of an objective lens for an endoscope of Example 5 and luminous flux is shown in FIG. 5. The objective lens for an endoscope of Example 5 has the same configuration as the overview of the objective lens for an endoscope of Example 1 except that a front group GA consists of only a first lens L1. The basic lens data of the objective lens for an endoscope of Example 5 are shown in Table 9, the specifications thereof are shown in Table 10, and a diagram showing the respective aberrations thereof is shown in FIG. 10. The name of the material of each component and the name of a manufacturer of the material are written together with a period interposed therebetween in the column of the name of a material of Table 9. The name of a manufacturer is written as the abbreviation. OHARA is OHARA Inc., HOYA is HOYA Corporation, and SUMITA is SUMITA OPTICAL GLASS, Inc.

TABLE 9

Example 5

| Sn | R | D | Nd | νd | Name of material |
|---|---|---|---|---|---|
| 1 | ∞ | 0.3732 | 1.88300 | 40.76 | S-LAH58.OHARA |
| 2 | 0.5800 | 0.4930 | | | |
| 3(St) | ∞ | 0.0000 | | | |
| 4 | 16.3970 | 1.0456 | 1.83400 | 37.17 | S-LAH60MQ.OHARA |
| 5 | −1.3040 | 0.1000 | | | |
| 6 | −10.4250 | 0.4543 | 1.65160 | 58.54 | S-LAL7Q.OHARA |
| 7 | −1.3820 | 0.1000 | | | |
| 8 | 2.0870 | 0.7079 | 1.49700 | 81.54 | S-FPL51.OHARA |
| 9 | −0.9530 | 0.2500 | 1.95906 | 17.47 | S-NPH3.OHARA |
| 10 | −3.3420 | 0.4343 | | | |
| 11 | ∞ | 0.7000 | 2.00100 | 29.13 | TAFD55.HOYA |
| 12 | ∞ | 0.3500 | 1.51633 | 64.06 | K-BK7.SUMITA |
| 13 | ∞ | 0.0000 | | | |

TABLE 10

Example 5

| | |
|---|---|
| f | 0.679 |
| Bf | 0.960 |
| FNo. | 4.02 |
| 2ω(°) | 134.2 |

The values of Conditional expressions (1) to (7) corresponding to the objective lenses for an endoscope of Examples 1 to 5 are shown in Table 11. In Examples 1 to 5, the d line is used as a reference wavelength. Table 11 shows values with respect to the d line.

TABLE 11

| Expression number | | Example 1 | Example 2 | Example 3 | Example 4 | Example 5 |
|---|---|---|---|---|---|---|
| (1) | $f2/fb$ | 1.414 | 1.299 | 1.401 | 1.479 | 1.567 |
| (2) | $\dfrac{R2f + R2r}{R2f - R2r}$ | 1.000 | 1.000 | 1.000 | 1.000 | 0.853 |
| (3) | $fa/fb$ | −0.581 | −0.565 | −0.558 | −0.641 | −0.692 |
| (4) | $f3/fb$ | 2.691 | 2.667 | 2.466 | 3.040 | 2.524 |
| (5) | $\dfrac{R3f + R3r}{R3f - R3r}$ | 1.000 | 0.774 | 0.725 | 0.924 | 1.306 |
| (6) | $\dfrac{R1f + R1r}{R1f - R1r}$ | 1.000 | 1.000 | 1.000 | 1.000 | 1.000 |
| (7) | $|vd4-vd5|$ | 57.23 | 62.64 | 77.19 | 57.23 | 64.07 |

As known from the above-mentioned data, although the objective lenses for an endoscope of Examples 1 to 5 employ simple configuration including five lenses and are reduced in the entire length and the outer diameter of the lens system, a wide angle of view is ensured and aberrations are corrected well. Accordingly, high optical performance is achieved. In more detail, the maximum total angles of view of the objective lenses for an endoscope of Examples 1 to 5 are 134° or more, and the chromatic aberrations thereof are corrected well over the entire range to a visible range from a short wavelength range having a wavelength of about 405 nm (nanometer).

Figure 11:
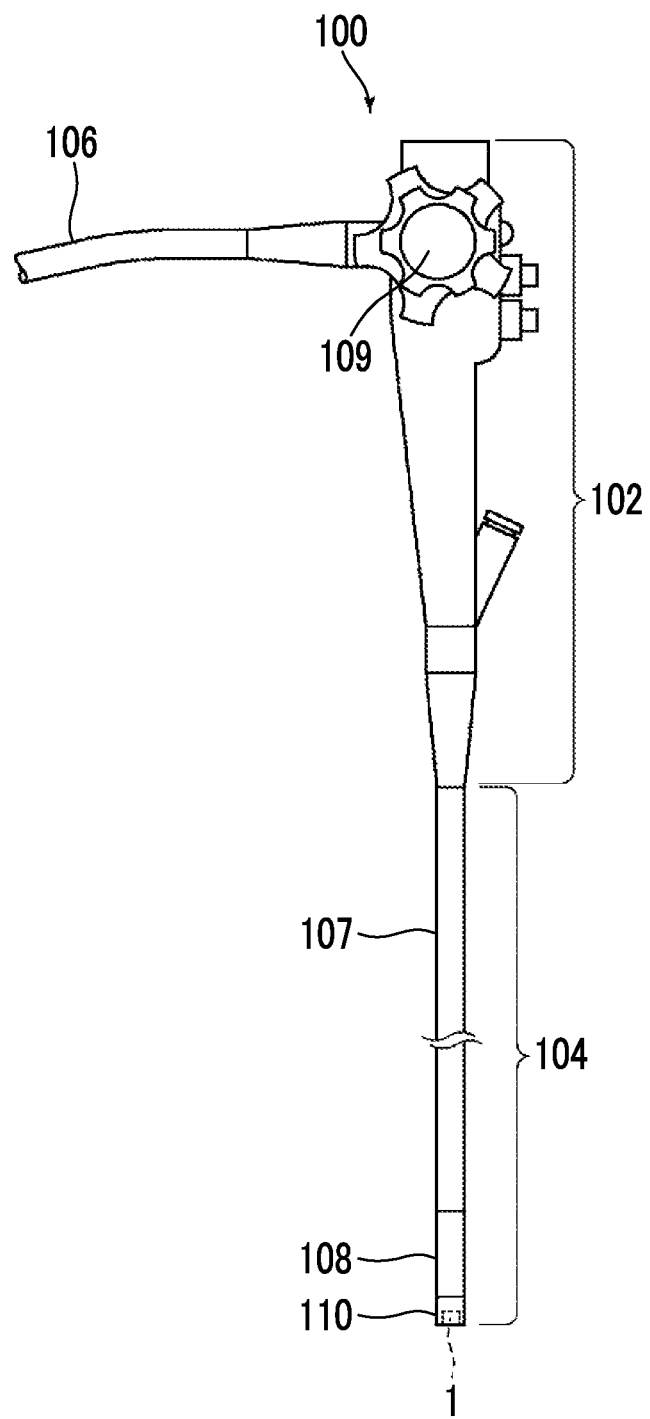
FIG. 11 is a diagram showing the schematic configuration of an endoscope according to an embodiment of the disclosure.

Next, an endoscope according to an embodiment of the disclosure will be described. A diagram showing the schematic configuration of the entire endoscope according to an embodiment of the disclosure is shown in FIG. 11. The endoscope 100 shown in FIG. 11 mainly comprises an operation part 102, an insertion part 104, and a universal cord 106 that is to be connected to a connector part (not shown). A large portion of the insertion part 104 is a soft portion 107 that is bendable in any direction along an insertion path, a bendable portion 108 is connected to the distal end of the soft portion 107, and a distal end portion 110 is connected to the distal end of the bendable portion 108. The bendable portion 108 is provided to allow the distal end portion 110 to face in a desired direction, and can be operated to be bent by the rotational movement of bending operation knobs 109 provided on the operation part 102. The objective lens 1 for an endoscope according to the embodiment of the disclosure is provided in the distal end of the distal end portion 110. The objective lens 1 for an endoscope is schematically shown in FIG. 11. Since the endoscope according to the embodiment of the disclosure comprises the objective lens for an endoscope according to the embodiment of the disclosure, the endoscope can be reduced in the diameter of the insertion part 104, can allow a user to make an observation with a large field of view, and can acquire a good image.

A technique of the disclosure has been described above using the embodiments and the examples, but the technique of the disclosure may have various modifications without being limited to the embodiments and the examples. For example, the radius of curvature, the surface interval, the refractive index, the Abbe's number, and the like of each lens may have other values without being limited to values shown in the respective numerical examples.

What is claimed is:

1. An objective lens for an endoscope consisting of:
a front group having negative refractive power, an aperture stop, and a rear group having positive refractive power that are arranged in this order from an object side toward an image side,
wherein the front group comprises only a first lens having negative refractive power as a lens,
the rear group comprises only four lenses that consist of a second lens having positive refractive power, a third lens having positive refractive power, a fourth lens, and a fifth lens arranged in this order from the object side toward the image side, as lenses,
the fourth lens and the fifth lens have refractive power having signs different from each other and are cemented to each other,
the aperture stop is disposed between the first lens and the second lens, and
in a case where a focal length of the second lens is denoted by f2, a focal length of the rear group is denoted by fb, a radius of curvature of a surface of the second lens close to the object side is denoted by R2f, and a radius of curvature of a surface of the second lens close to the image side is denoted by R2r, Conditional expressions (1) and (2) are satisfied, $$1 < f2/fb < 1.8 \quad (1)$$

$$0 < (R2f+R2r)/(R2f-R2r) < 5 \quad (2).$$

2. The objective lens for an endoscope according to claim 1,
wherein in a case where a focal length of the front group is denoted by fa, Conditional expression (3) is satisfied, $$-0.8 < fa/fb < -0.4 \quad (3).$$

3. The objective lens for an endoscope according to claim 1,
wherein in a case where a focal length of the third lens is denoted by f3, a radius of curvature of a surface of the third lens close to the object side is denoted by R3f, and a radius of curvature of a surface of the third lens close to the image side is denoted by R3r, Conditional expressions (4) and (5) are satisfied, $$2 < f3/fb < 5 \quad (4)$$

$$0 < (R3f+R3r)/(R3f-R3r) < 5 \quad (5).$$

4. The objective lens for an endoscope according to claim 1,
wherein in a case where a radius of curvature of a surface of the first lens close to the object side is denoted by R1f and a radius of curvature of a surface of the first lens close to the image side is denoted by R1r, Conditional expression (6) is satisfied, $$0.95 < (R1f+R1r)/(R1f-R1r) < 1.2 \quad (6).$$

5. The objective lens for an endoscope according to claim 1,
wherein a surface of the first lens close to the object side is a flat surface.

6. The objective lens for an endoscope according to claim 1,
wherein in a case where an Abbe's number of the fourth lens with respect to a d line is denoted by vd4 and an Abbe's number of the fifth lens with respect to the d line is denoted by vd5, Conditional expression (7) is satisfied, $$45 < |vd4-vd5| < 90 \quad (7).$$

7. The objective lens for an endoscope according to claim 1,
wherein the fourth lens has positive refractive power and the fifth lens has negative refractive power.

8. The objective lens for an endoscope according to claim 1,
wherein Conditional expression (1-1) is satisfied, $$1.2 < f2/fb < 1.6 \quad (1\text{-}1).$$

9. The objective lens for an endoscope according to claim 1,
wherein Conditional expression (2-1) is satisfied, $$0.5 < (R2f+R2r)/(R2f-R2r) < 1.5 \quad (2\text{-}1).$$

10. The objective lens for an endoscope according to claim 2,
wherein Conditional expression (3-1) is satisfied, $$-0.7 < fa/fb < -0.5 \quad (3\text{-}1).$$

11. The objective lens for an endoscope according to claim 3, wherein Conditional expression (4-1) is satisfied, $$2.4 < f3/fb < 3.2 \qquad (4\text{-}1).$$

12. The objective lens for an endoscope according to claim 3,
wherein Conditional expression (5-1) is satisfied, $$0.5 < (R2f+R2r)/(R2f-R2r) < 1.5 \qquad (5\text{-}1).$$

13. The objective lens for an endoscope according to claim 4,
wherein Conditional expression (6-1) is satisfied, $$1 \leq (R1f+R1r)/(R1f-R1r) < 1.05 \qquad (6\text{-}1).$$

14. The objective lens for an endoscope according to claim 6,
wherein Conditional expression (7-1) is satisfied, $$55 < |vd4-vd5| < 80 \qquad (7\text{-}1).$$

15. An endoscope comprising:
the objective lens for an endoscope according to claim 1.

16. The objective lens for an endoscope according to claim 6,
wherein the fourth lens and the fifth lens are cemented to each other to form a cemented lens, which is the only cemented lens in the objective lens.

* * * * *